(12) United States Patent
Seck et al.

(10) Patent No.: US 12,464,008 B2
(45) Date of Patent: Nov. 4, 2025

(54) AUTOMATIC COMPLIANCE ASSESSMENT OF CLOUD INFRASTRUCTURE CODE

(71) Applicant: Capital One Services, LLC, McLean, VA (US)

(72) Inventors: Mohamed Seck, Aubrey, TX (US); Grant Michael Iwan, Montpelier, VA (US); Shannon Reid, Richmond, VA (US); Krystan R. Franzen, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 86 days.

(21) Appl. No.: 18/440,832

(22) Filed: Feb. 13, 2024

(65) Prior Publication Data
US 2025/0260706 A1    Aug. 14, 2025

(51) Int. Cl.
*H04L 9/40*    (2022.01)
(52) U.S. Cl.
CPC .............................. *H04L 63/1433* (2013.01)
(58) Field of Classification Search
None
See application file for complete search history.

(56) References Cited

U.S. PATENT DOCUMENTS

2022/0030062 A1*    1/2022    Jennings ............. H04L 67/1097

OTHER PUBLICATIONS

Co-pending U.S. Appl. No. 18/305,095, filed Apr. 21, 2023, entitled "Compliance for Cloud-Based Application and Computer Systems Using Machine Learning".

* cited by examiner

*Primary Examiner* — Cai Y Chen
(74) *Attorney, Agent, or Firm* — Harrity & Harrity, LLP

(57) ABSTRACT

In some implementations, a compliance system may receive, from a pipeline system, a set of properties associated with configuration of a cloud infrastructure. Additionally, the compliance system may receive, from a code repository, a set of computer code associated with the cloud infrastructure. The compliance system may provide the set of properties and the set of computer code to a machine learning model to receive a set of compliance indicators and a set of severity levels. Each compliance indicator in the set of compliance indicators being associated with a corresponding severity level in the set of severity levels. The compliance system may selectively deploy the cloud infrastructure in response to receiving the set of severity levels.

20 Claims, 13 Drawing Sheets

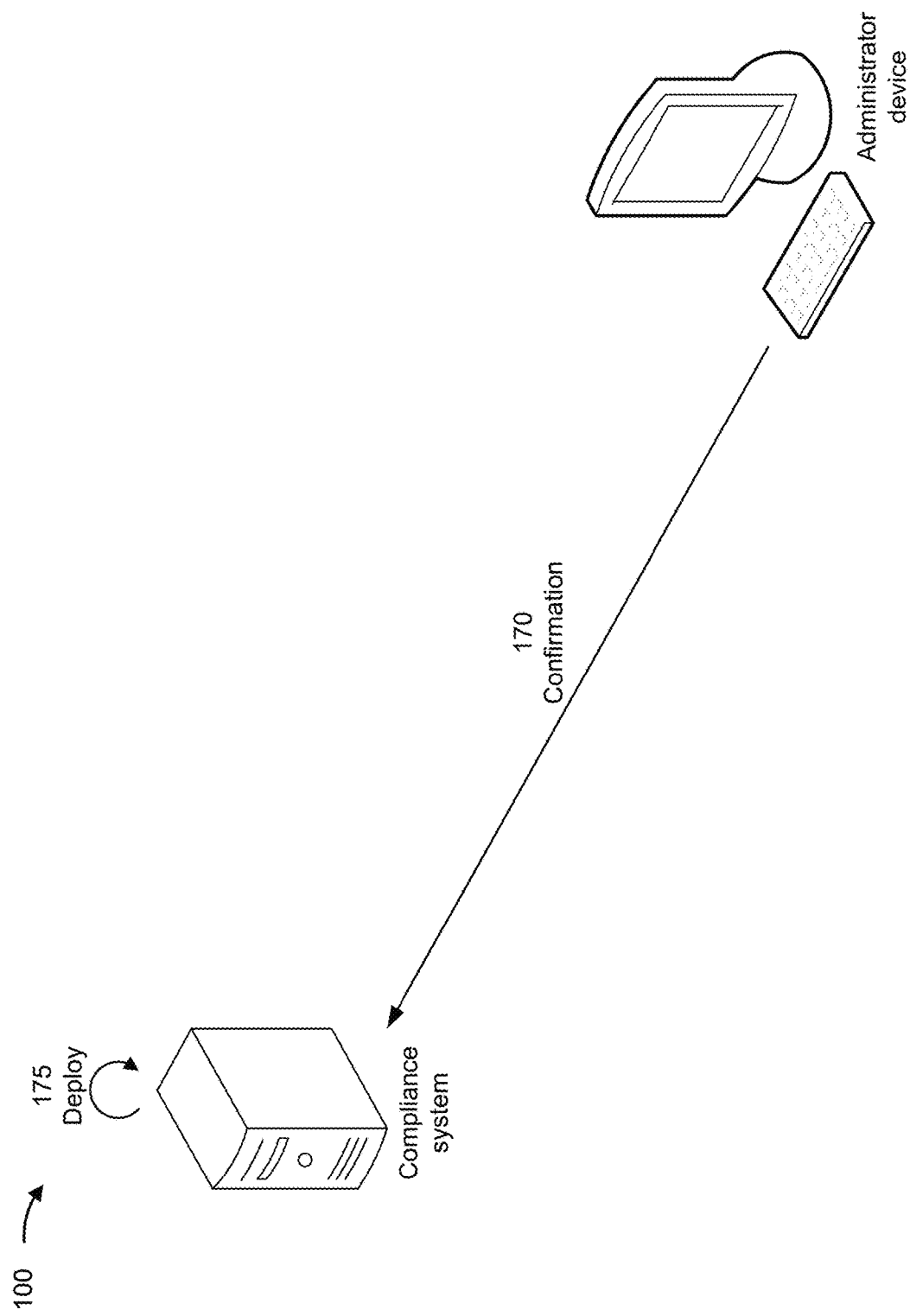

AUTOMATIC COMPLIANCE ASSESSMENT OF CLOUD INFRASTRUCTURE CODE

BACKGROUND

Cloud infrastructure may be associated with different requirements. Compliance with the requirements may impact security of the cloud infrastructure. In other words, security vulnerabilities may arise when the cloud infrastructure is not compliant with the requirements. These security vulnerabilities can result in downtime for the cloud infrastructure.

SUMMARY

Some implementations described herein relate to a system for automatic compliance assessment of cloud infrastructure code. The system may include one or more memories and one or more processors communicatively coupled to the one or more memories. The one or more processors may be configured to receive, from a pipeline system, a set of properties associated with configuration of a cloud infrastructure. The one or more processors may be configured to receive, from a code repository, a set of computer code associated with the cloud infrastructure. The one or more processors may be configured to provide the set of properties and the set of computer code to a machine learning model to receive a set of compliance indicators and a set of severity levels, each compliance indicator in the set of compliance indicators being associated with a corresponding severity level in the set of severity levels. The one or more processors may be configured to selectively deploy the cloud infrastructure based on the set of severity levels.

Some implementations described herein relate to a method of automatic compliance assessment of cloud infrastructure code. The method may include receiving, from a pipeline system and at a compliance system, a set of properties associated with configuration of a cloud infrastructure. The method may include providing, by the compliance system, the set of properties to a machine learning model to receive a set of compliance indicators and a set of severity levels, each compliance indicator in the set of compliance indicators being associated with a corresponding severity level in the set of severity levels. The method may include selectively deploying, by the compliance system, the cloud infrastructure in response to receiving the set of severity levels.

Some implementations described herein relate to a non-transitory computer-readable medium that stores a set of instructions for automatic compliance assessment of cloud infrastructure code. The set of instructions, when executed by one or more processors of a device, may cause the device to receive, from a code repository, a set of computer code associated with a cloud infrastructure. The set of instructions, when executed by one or more processors of the device, may cause the device to provide the set of computer code to a machine learning model to receive a set of compliance indicators and a set of severity levels, each compliance indicator in the set of compliance indicators being associated with a corresponding severity level in the set of severity levels. The set of instructions, when executed by one or more processors of the device, may cause the device to selectively deploy the cloud infrastructure in response to receiving the set of severity levels.

BRIEF DESCRIPTION OF THE DRAWINGS

FIGS. 1A-1E are diagrams of an example implementation relating to automatic compliance assessment of cloud infrastructure code, in accordance with some embodiments of the present disclosure.

DETAILED DESCRIPTION

Figure 1A:
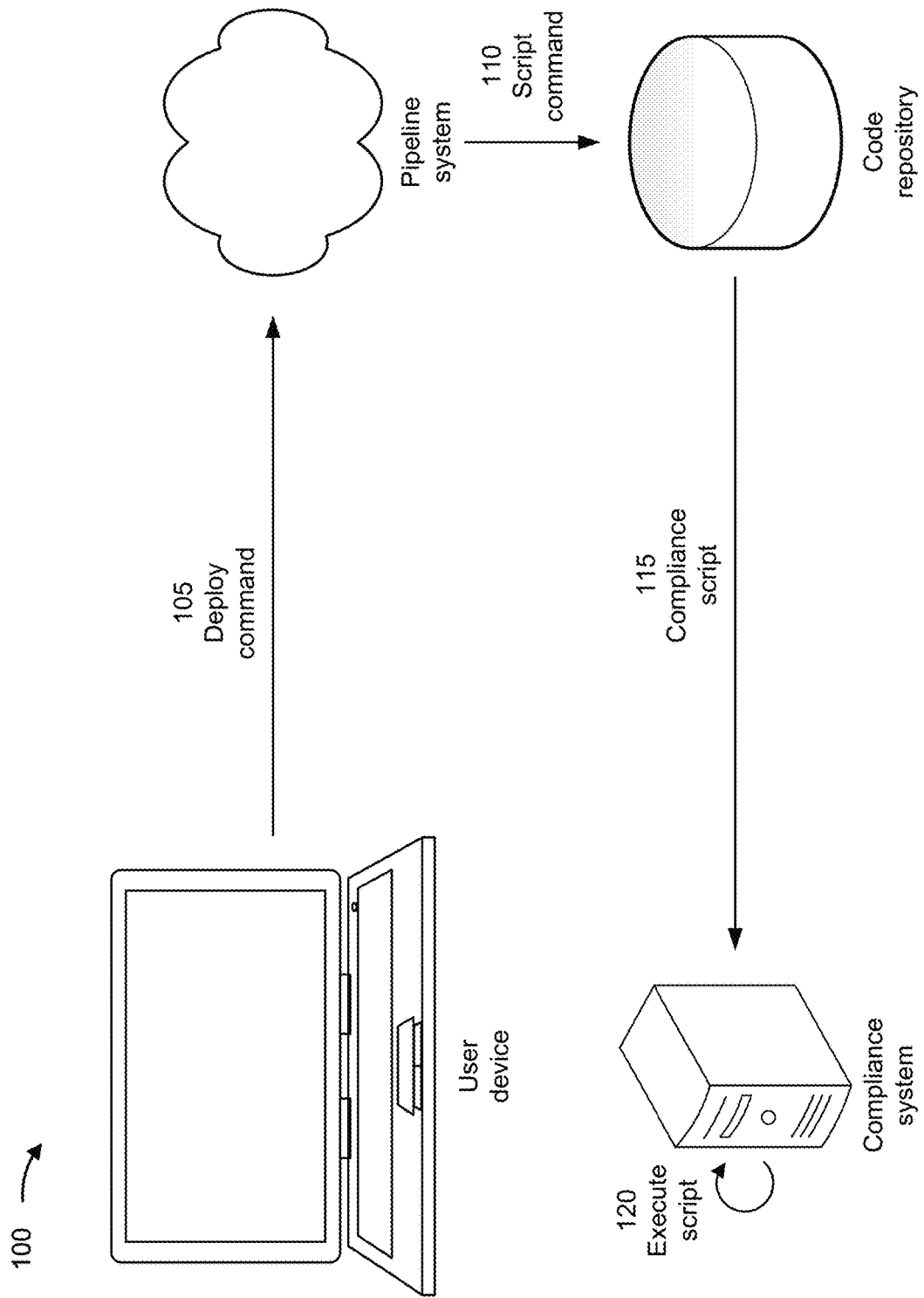

The following detailed description of example implementations refers to the accompanying drawings. The same reference numbers in different drawings may identify the same or similar elements.

Cloud infrastructure may be associated with a set of requirements. As used herein, "cloud infrastructure" may refer to hardware resources, cloud storages virtualized over the hardware resources, and/or cloud-based applications executed over the hardware resources (e.g., relying on a hypervisor and/or another type of resource management component). Some requirements may be associated with properties of applications and/or storages. For example, permissions associated with the storages, access control lists associated with the applications, and encryption choices for the storages, are among a few examples of properties that may be governed by a set of requirements. Some requirements may be associated with code that establishes, or executes within, the cloud infrastructure. For example, avoiding memory leaks, controlling application programming interface (API) access, and encryption choices for variables, are among a few examples of code quality that may be governed by a set of requirements.

Compliance with the set of requirements may impact security of the cloud infrastructure. In other words, security vulnerabilities may arise when the cloud infrastructure is non-compliant. For example, cloud infrastructure that uses out-of-date cloud-based applications, includes unencrypted storages, and/or causes memory leaks may be vulnerable to attacks. Resolving these security vulnerabilities can result in downtime for the cloud infrastructure, which increases latency for any users that depend on the cloud infrastructure.

Some implementations described herein enable automated detection of compliance problems with cloud infrastructure. For example, machine learning may be applied when cloud infrastructure is deployed and/or modified in order to determine compliance of the cloud infrastructure. As a result, deployment may be blocked in response to a determination of non-compliance, which ensures that the cloud infrastructure is more secure when finally deployed. A more secure cloud infrastructure suffers less downtime, which reduces latency for any users that depend on the cloud infrastructure. Similarly, minor compliance issues may be automatically communicated (e.g., to an administrator) after the cloud infrastructure is deployed and/or modified. As a result, latency is reduced because the cloud infrastructure is not blocked from deployment, and security is still improved because the minor compliance issues are more likely to be addressed quickly.

FIGS. 1A-1E are diagrams of an example 100 associated with automatic compliance assessment of cloud infrastructure code. As shown in FIGS. 1A-1E, example 100 includes a user device, a pipeline system, a code repository, a compliance system, a machine learning (ML) model (e.g., provided by an ML host), and an administrator device. These devices are described in more detail in connection with FIGS. 3 and 4.

As shown in FIG. 1A and by reference number 105, the user device may transmit, and the pipeline system may receive, a command to deploy a cloud infrastructure. The command may be an API call from the user device (e.g., indicating the cloud infrastructure in an argument). In some implementations, a user of the user device may provide input (e.g., using an input component of the user device) that triggers the user device to transmit the command. For example, a web browser (and/or another application executed by the user device) may navigate to a website controlled by (or at least associated with) the pipeline system and may output a user interface (UI) (e.g., using an output component of the user device) to the user. Therefore, the user may interact with the UI to provide the input that triggers the user device to transmit the command. In another example, the user may provide the input using a command line, a bash shell, or another type of text interface. Additionally, or alternatively, the user device may transmit the command automatically. For example, the user device may transmit the command periodically (e.g., according to a schedule, whether a default schedule or a schedule configured by the user). In another example, the user device may transmit the command in response to a trigger event.

The pipeline system may forward the command to the code repository. For example, as shown by reference number 110, the pipeline system may transmit, and the code repository may receive, a command to execute a script (e.g., configured to check the cloud infrastructure for compliance). The script may include a set of Bourne Again Shell (BASH) instructions, a set of Python instructions, and/or another set of sequential instructions for execution. The pipeline system may select the script (e.g., from a plurality of possible scripts) based on the cloud infrastructure. For example, the pipeline system may select one script based on the cloud infrastructure including at least one cloud storage and may select a different script based on the cloud infrastructure lacking cloud storages. In another example, the pipeline system may select one script based on the cloud infrastructure using a first type of hypervisor and/or a first type of operating system (OS) and may select a different script based on the cloud infrastructure using a second type of hypervisor and/or a second type of OS. In yet another example, the pipeline system may select one script based on the cloud infrastructure using a first type of access control for cloud-based applications and may select a different script based on the cloud infrastructure using a second type of access control for the cloud-based applications.

Additionally, or alternatively, the pipeline system may transmit the command directly (e.g., by forwarding, to the code repository and from the user device, packets that include the command, or by decoding packets from the user device and re-encoding the command into packets that are transmitted to the code repository). Accordingly, the code repository may select the script (e.g., similarly as described above) rather than the pipeline system.

The code repository may retrieve the script (e.g., from a cache or another type of memory controlled by the code repository) so that the cloud infrastructure may be checked for compliance before deployment. For example, as shown by reference number 115, the code repository may transmit, and the compliance system may receive, the script. Accordingly, the compliance system may execute the script in order to check the cloud infrastructure for compliance.

Additionally, or alternatively, the code repository may transmit the command directly (e.g., by forwarding packets, to the compliance system and from the pipeline system, that include the command, or by decoding packets from the pipeline system and re-encoding the command into packets that are transmitted to the compliance system). Accordingly, the compliance system may select the script (e.g., similarly as described above) rather than the pipeline system.

Although the example 100 is described with the compliance system as separate (e.g., physically, logically, and/or virtually) from the code repository and the pipeline system, other examples may include the compliance system as at least partially integrated (e.g., physically, logically, and/or virtually) with the code repository and/or the pipeline system. For example, the compliance system may include software that executes over (and/or is supported by) hardware of the code repository and/or the pipeline system. In another example, two or more of the compliance system, the code repository, or the pipeline system may execute over (and/or be supported by) a same cloud computing system (e.g., as described in connection with FIG. 3).

As shown by reference number 120, the compliance system may execute the script to determine compliance of the cloud infrastructure (e.g., with a set of requirements). Although the example 100 is described in connection with the user device transmitting the command to the pipeline system, other examples may include the user device transmitting the command to the code repository (e.g., similarly as described in connection with FIG. 2A). Additionally, or alternatively, the user device may transmit the command directly to the compliance system. Accordingly, the compliance system may transmit, and the code repository may receive, a request for the script, and the code repository may transmit, and the compliance system may receive, the script in response to the request.

Figure 1B:
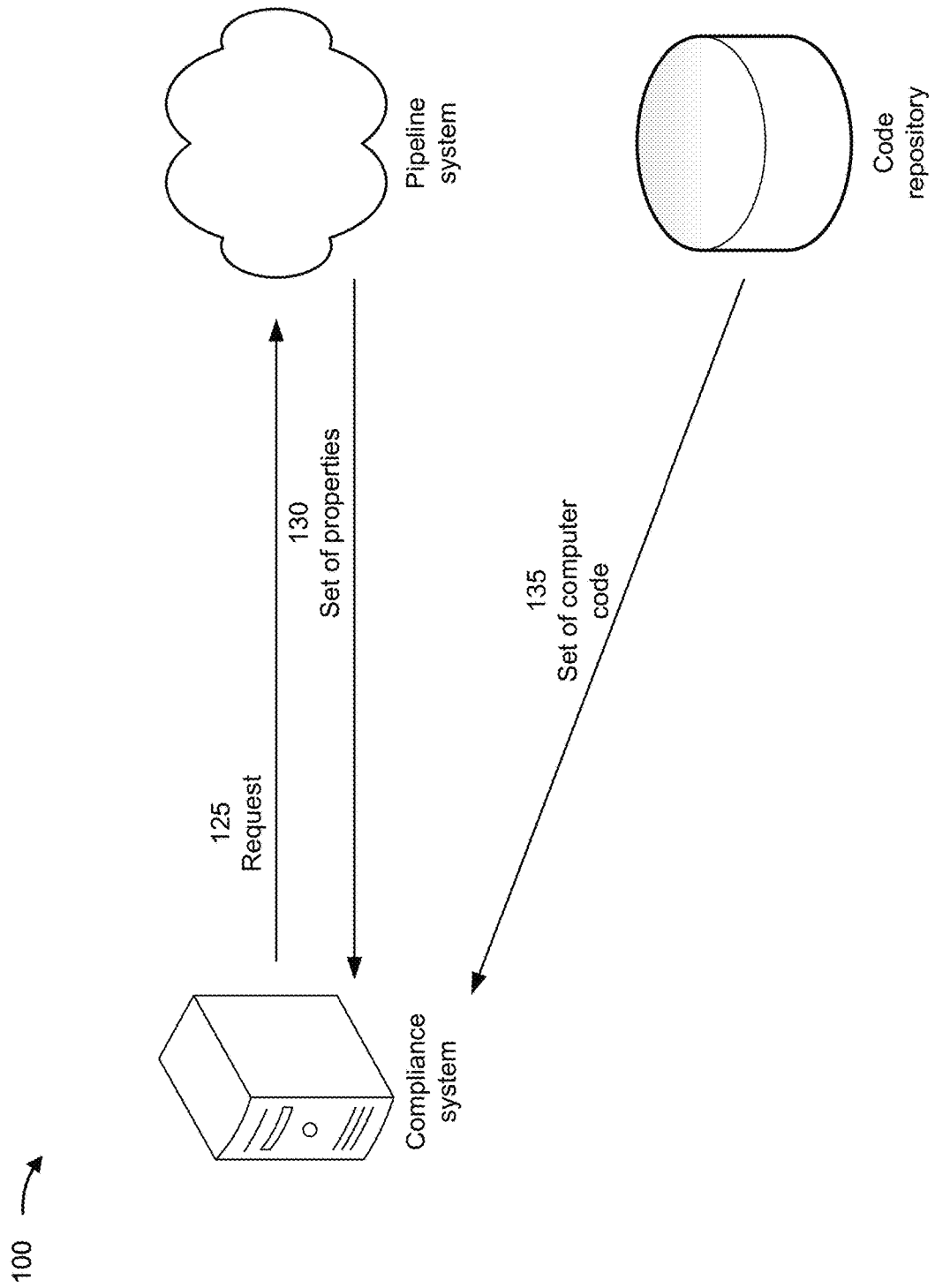

As shown in FIG. 1B and by reference number 125, the compliance system may transmit, and the pipeline system may receive, a request for a set of properties associated with configuration of the cloud infrastructure. The request may include a hypertext transfer protocol (HTTP) request, a file transfer protocol (FTP) request, and/or an API call, among other examples. The request may indicate (e.g., in a header and/or as an argument) the cloud infrastructure. In some implementations, the compliance system may transmit the request in response to the command and/or the script from the code repository, as described above in connection with reference number 115. Additionally, or alternatively, the compliance system may transmit the request based on executing the script (e.g., because transmitting the request is included in an instruction in the script).

As shown by reference number 130, the pipeline system may transmit, and the compliance system may receive, the set of properties. The set of properties may be encoded in a table (or another type of relational data structure) or a graph (or another type of NoSQL data structure), among other examples. The pipeline system may transmit the set of properties in an HTTP response, in an FTP response, and/or as a return from an API function.

Although the example 100 is described in connection with the compliance system requesting the set of properties, other examples may include the pipeline system automatically transmitting the set of properties to the compliance system. For example, similarly as described in connection with FIG. 2B, the pipeline system may automatically transmit the set of properties in response to the command from the user device.

As shown by reference number 135, the code repository may transmit, and the compliance system may receive, a set of computer code associated with the cloud infrastructure. The set of computer code may comprise files (e.g., one or more files). In other words, the set of computer code may be included in (e.g., encoded in) the files. For example, the files may include library files (e.g., from the C++ Standard Library, the Python® Standard Library, or the Java® Class Library, among other examples) in addition to source code files. In some implementations, the code repository may automatically transmit the set of computer code in response to the command and/or the script from the pipeline system. The code repository may transmit the set of computer code in a same message as the command and/or the script (that is transmitted to the compliance system) or in a different message.

Although the example 100 is described in connection with the code repository automatically transmitting the set of computer code, other examples may include the compliance system requesting the set of computer code. For example, similarly as described in connection with FIG. 2B, the compliance system may transmit, and the code repository may receive, a request for the set of computer code, and the code repository may transmit, and the compliance system may receive, the set of computer code in response to the request.

Figure 1C:
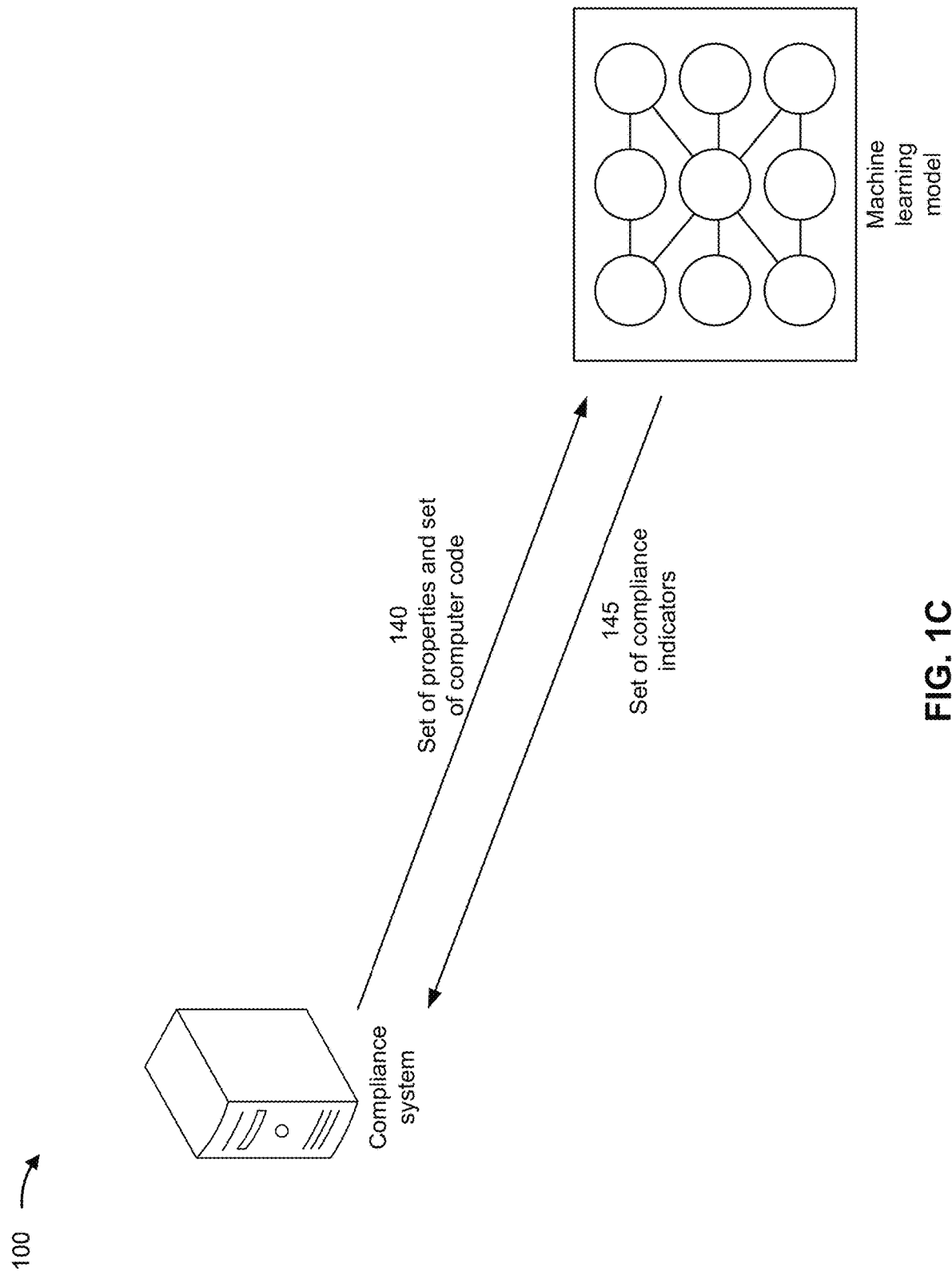

As shown in FIG. 1C and by reference number 140, the compliance system may provide the set of properties and/or the set of computer code to the ML model. For example, the compliance system may transmit, and the ML host may receive, a request including the set of properties and/or the set of computer code. In some implementations, the compliance system may transmit the request based on executing the script (e.g., because transmitting the request to the ML host is included in an instruction in the script). Alternatively, the script may encode a portion of the ML model (e.g., as a series of linear regressions or another type of machine learning algorithm, as described in greater detail below), such that executing the script executes the ML model.

The ML model may be trained (e.g., by the ML host and/or a device at least partially separate from the ML host) using labeled sets of properties and/or labeled sets of computer code (e.g., for supervised learning). Additionally, or alternatively, the ML model may be trained using unlabeled sets of properties and/or unlabeled sets of computer code (e.g., for deep learning). The ML model may be configured to determine a set of compliance indicators, for the cloud infrastructure, based on the set of properties and/or the set of computer code. Each compliance indicator may include a qualitative measurement (e.g., a score and/or a letter grade, among other examples) and/or a quantitative measurement (e.g., a description of a security vulnerability predicted to be present in the cloud infrastructure). Example compliance indicators may include a stack indicator, a monitoring setup indicator, a security indicator, or a library indicator. In some implementations, the ML model may be trained on a set of compliance rules (e.g., a set of requirements for the cloud infrastructure). Additionally, or alternatively, the ML model may be trained based on deployed cloud infrastructures. Therefore, in one example, the ML model may be configured to compare the cloud infrastructure to the deployed cloud infrastructures (e.g., in order to suggest changes to the cloud infrastructure based on the comparison). Additionally, or alternatively, the ML model may be configured to cluster the cloud infrastructure with the deployed cloud infrastructures.

In some implementations, the ML model may include a regression algorithm (e.g., linear regression or logistic regression), which may include a regularized regression algorithm (e.g., Lasso regression, Ridge regression, or Elastic-Net regression). Additionally, or alternatively, the ML model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., sets of properties and/or sets of computer code associated with existing cloud infrastructures). For example, for a regression algorithm, a model parameter may include a regression coefficient (e.g., a weight). For a decision tree algorithm, a model parameter may include a decision tree split location, as an example.

Additionally, the ML host (and/or a device at least partially separate from the ML host) may use one or more hyperparameter sets to tune the ML model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

As shown by reference number 145, the compliance system may receive the set of compliance indicators from the ML model (e.g., from the ML host). For example, the compliance system may receive a table, an array, and/or another type of data structure encoding the set of compliance indicators. The set of compliance indicators may be associated with a corresponding set of severity levels. For example, each compliance indicator in the set may be associated with a severity level in the corresponding set (e.g., on a one-to-one basis). Each severity level may be qualitative (e.g., a score and/or a letter grade, among other examples) and/or quantitative (e.g., a description of any security vulnerabilities predicted to be present in the cloud infrastructure).

Although the example 100 is described in connection with a single ML model, other examples may include an ensemble of ML models. For example, the script executed by the compliance system may indicate a particular ML model in the ensemble (and/or indicate a particular ML host associated with the particular ML model) to apply. Additionally, or alternatively, the ML host may select the ML model from the ensemble based on the cloud infrastructure. For example, the ML host may select one ML model based on the cloud infrastructure including at least one cloud storage and may select a different ML model based on the cloud infrastructure lacking cloud storages. In another example, the ML host may select one ML model based on the cloud infrastructure using a first type of hypervisor and/or a first type of OS and may select a different ML model based on the cloud infrastructure using a second type of hypervisor and/or a second type of OS. In yet another example, the ML host may select one ML model based on the cloud infrastructure using a first type of access control for cloud-based applications and may select a different ML model based on the cloud infrastructure using a second type of access control for the cloud-based applications.

The compliance system may therefore selectively deploy the cloud infrastructure using the corresponding set of severity levels. Selective deployment may be based on the corresponding set of severity levels satisfying a condition (e.g., one or more conditions). For example, the compliance system may automatically deploy the cloud infrastructure (e.g., by transmitting a command to the code repository and/or to the pipeline system, such as a compilation command) based on the corresponding set of severity levels lacking a high severity level. In other words, the compliance system may deploy the cloud infrastructure in response to each severity level satisfying a high severity level threshold and/or including text that lacks words indicating of a high severity level. In another example, the compliance system may refrain from deploying the cloud infrastructure (e.g., may block deployment by refraining from transmitting the command to the code repository and/or to the pipeline system) based on the corresponding set of severity levels including a high severity level (e.g., at least one high severity level). In other words, the compliance system may refrain from deploying the cloud infrastructure in response to (at least one of) the severity levels failing to satisfy a high severity level threshold and/or including text with words indicating of a high severity level.

Selectively deploying cloud infrastructure ensures that the cloud infrastructure is more secure when finally deployed. Indeed, the compliance system may selectively deploy the cloud infrastructure in response to receiving the set of compliance indicators (e.g., from the ML model). A more secure cloud infrastructure suffers less downtime, which reduces latency for any users that depend on the cloud infrastructure.

Figure 1D:
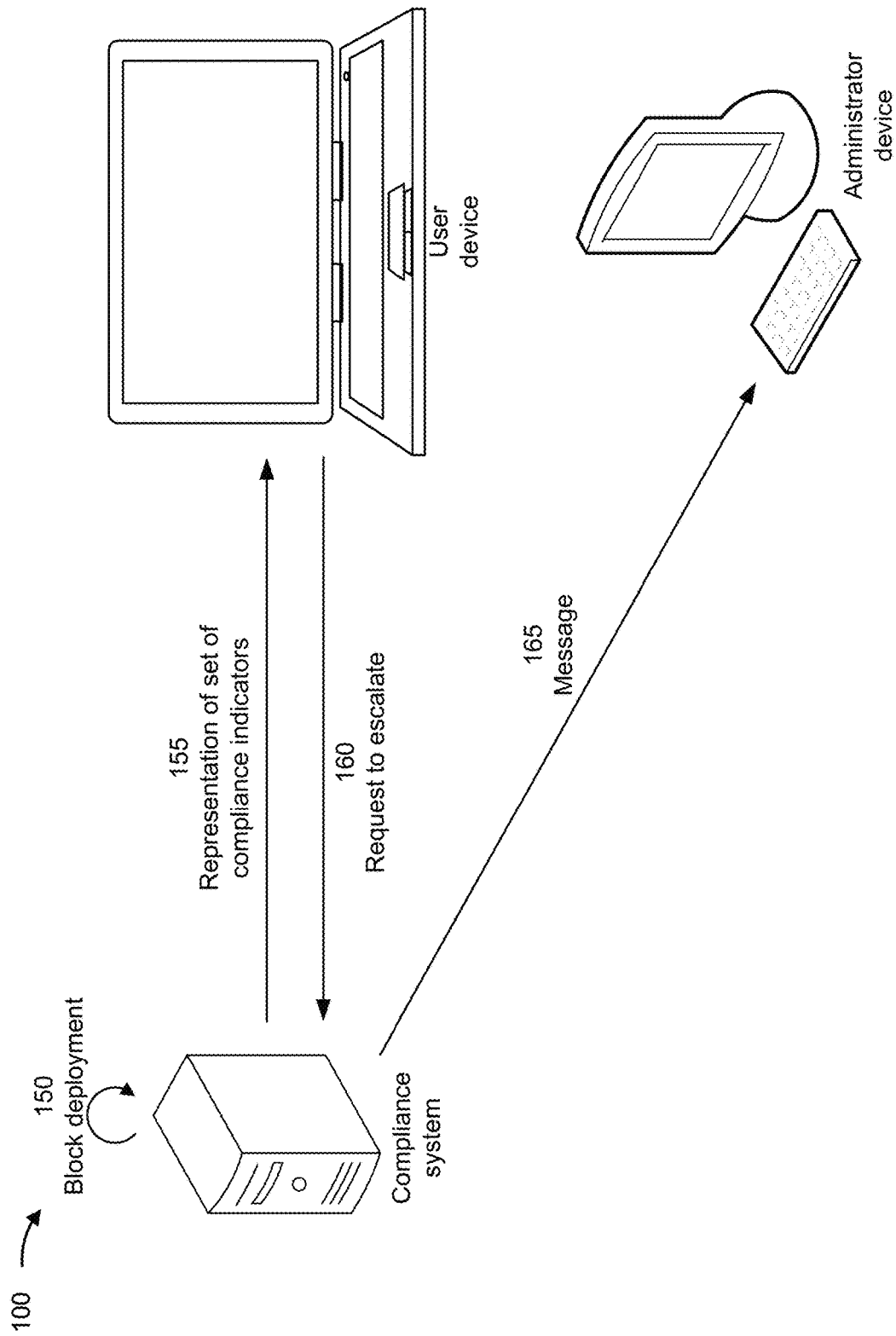

As shown in FIG. 1D and by reference number 150, the compliance system may block deployment of the cloud infrastructure (e.g., based on a high severity level, as described above). Therefore, the compliance system may transmit, and the user device may receive, a representation of the set of compliance indicators, as shown by reference number 155. The representation may include text indicating the set of compliance indicators (e.g., as scores and/or letter grades, among other examples) and/or a UI visualizing the set of compliance indicators (e.g., using colors associated with different severity levels, among other examples). Additionally, or alternatively, the compliance system may transmit, and the user device may receive, a report encoding the set of compliance indicators (e.g., a portable document format (pdf) file and/or another type of report).

In some situations, the cloud infrastructure may be necessary even when the corresponding set of severity levels includes a high severity level. Additionally, or alternatively, the set of compliance indicators may include an erroneous indicator. Therefore, as shown by reference number 160, the user device may transmit, and the compliance system may receive, a request to escalate the set of compliance indicators. The request to escalate may thus be a request to proceed (with deployment of the cloud infrastructure). In some implementations, the user of the user device may provide input (e.g., using an input component of the user device) that triggers the user device to transmit the request. For example, the representation of the set of compliance indicators may include a UI, and the user may interact with the UI to provide the input that triggers the user device to transmit the request. In another example, the user may provide the input using a command line, a bash shell, or another type of text interface.

In some implementations, a mitigation plan (for at least a portion of the set of compliance indicators) may be required to request escalation. Accordingly, similarly as described in connection with FIG. 2D, the compliance system may generate the mitigation plan. Additionally, or alternatively, the user device may transmit, and the compliance system may receive, the mitigation plan (e.g., in a same message as the request to escalate or in a different message). In a combinatory example, the user device may transmit, and the compliance system may receive, an approval of the mitigation plan generated by the compliance system. Additionally, or alternatively, a reason (whether a code and/or an explanation) may be required to request escalation. Accordingly, the user device may transmit, and the compliance system may receive, the reason (e.g., in a same message as the request to escalate or in a different message).

As shown by reference number 165, the compliance system may transmit, and the administrator device may receive, a message. The compliance system may transmit the message in response to the request from the user device. The message may indicate (at least a portion of) the set of compliance indicators. The message may further indicate the mitigation plan and/or the reason, as described above.

As shown in FIG. 1E and by reference number 170, the administrator device may transmit, and the compliance system may receive, a confirmation to proceed. In some implementations, an administrator associated with the administrator device may provide input (e.g., using an input component of the administrator device) that triggers the administrator device to transmit the confirmation. For example, the message may be output to the administrator (e.g., using an output component of the administrator device) using a UI, and the administrator may interact with the UI to provide the input that triggers the administrator device to transmit the confirmation. In another example, the administrator may provide the input using a command line, a bash shell, or another type of text interface.

As shown by reference number 175, the compliance system may deploy the cloud infrastructure in response to the confirmation from the administrator device. Therefore, selectively deploying the cloud infrastructure may include allowing the administrator device to override high severity levels in the set of severity levels.

Although the example 100 is described in connection with a single administrator device, other examples may include a plurality of administrator devices. For example, the compliance system may transmit the message to multiple administrator devices. Accordingly, the compliance system may wait for confirmation from all (or at least a majority) of the administrator devices before deploying the cloud infrastructure.

When the compliance system deploys the cloud infrastructure (e.g., whether automatically or in response to the confirmation described in connection with reference number 170), the cloud infrastructure may still be associated with a medium severity level (e.g., at least one medium severity level) and/or a low severity level (e.g., at least one low severity level) in the corresponding set of severity levels. Therefore, the compliance system may transmit, and a ticket system may receive, a command to open a ticket (e.g., at least one ticket) for a compliance indicator (e.g., at least one compliance indicator), in the set of compliance indicators, associated with a medium severity level or a low severity level. The ticket system may include an issue tracking system, such as Jira® or Bugzilla®, among other examples. The ticket system may communicate the compliance indicator to the administrator device, the user device, and/or another device associated with a responsible party for the cloud infrastructure. Because the compliance indicator is automatically communicated (e.g., to an administrator) after the cloud infrastructure is deployed, latency is reduced because the cloud infrastructure is not blocked from deployment, and security is still improved because any issues associated with the medium severity level and/or the low severity level are more likely to be addressed quickly.

As indicated above, FIGS. 1A-1E are provided as an example. Other examples may differ from what is described with regard to FIGS. 1A-1E.

FIGS. 2A-2E are diagrams of an example 200 associated with automatic compliance assessment of cloud infrastructure code. As shown in FIGS. 2A-2E, example 200 includes a user device, a pipeline system, a code repository, a compliance system, an ML model (e.g., provided by an ML host), and an administrator device. These devices are described in more detail in connection with FIGS. 3 and 4.

Figure 2A:
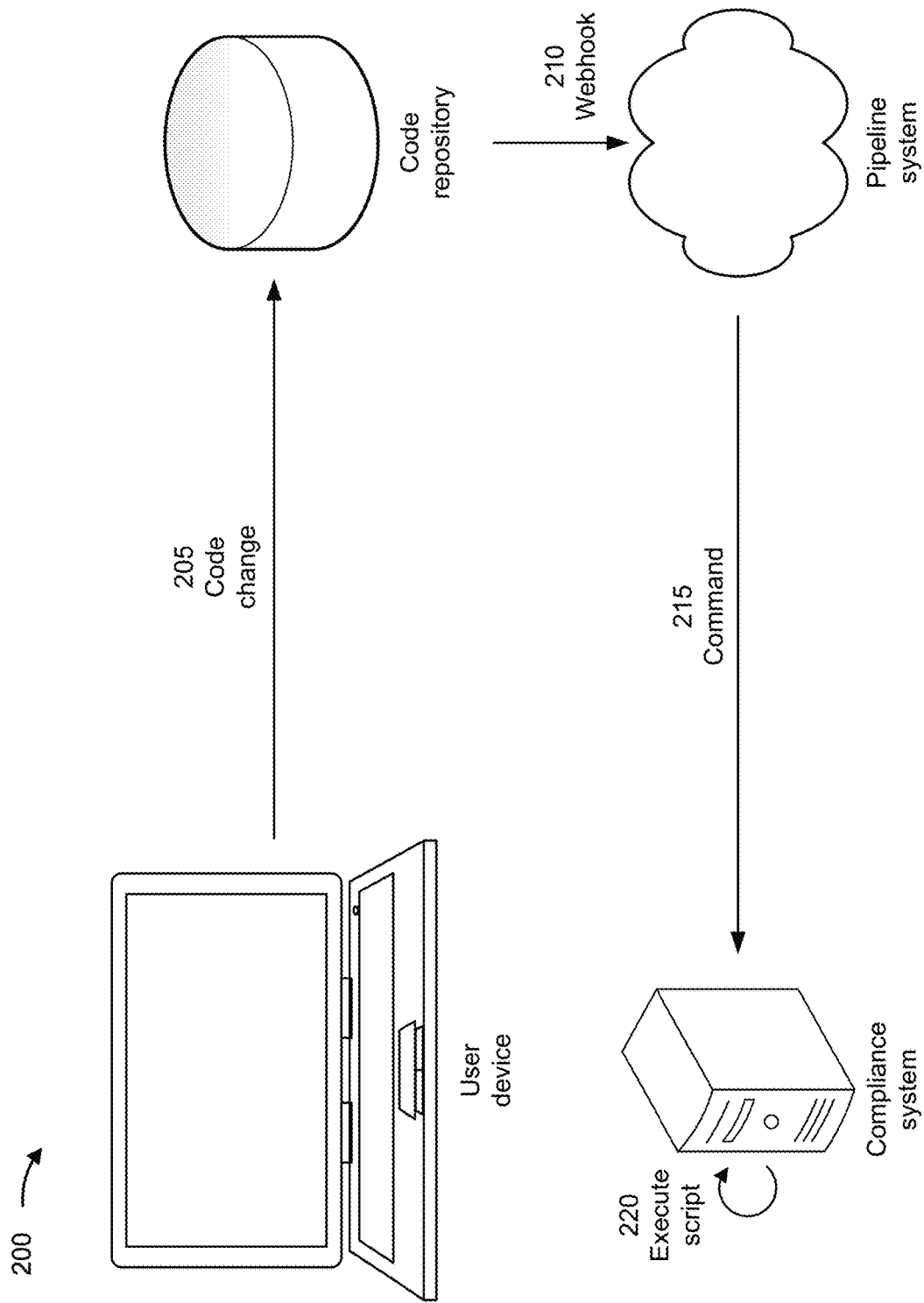
FIGS. 2A-2E are diagrams of an example implementation relating to automatic compliance assessment of cloud infrastructure code, in accordance with some embodiments of the present disclosure.

As shown in FIG. 2A and by reference number 205, the user device may transmit, and the code repository may receive, a change to a set of computer code associated with a cloud infrastructure. The command may be an API call from the user device (e.g., indicating the cloud infrastructure in an argument). In some implementations, a user of the user device may provide input (e.g., using an input component of the user device) that triggers the user device to transmit the change. For example, a web browser (and/or another application executed by the user device) may navigate to a website controlled by (or at least associated with) the code repository and may output a UI (e.g., using an output component of the user device) to the user. Therefore, the user may interact with the UI to provide the input that triggers the user device to transmit the change. In another example, the user may provide the input using a command line, a bash shell, or another type of text interface. Additionally, or alternatively, the user device may transmit the change automatically. For example, the user device may transmit the change periodically (e.g., according to a schedule, whether a default schedule or a schedule configured by the user). In another example, the user device may transmit the change in response to a trigger event.

The code repository may trigger a webhook configured by the pipeline system. As used herein, "webhook" refers to a web callback, an HTTP push API, or a reverse API, among other examples, that automatically executes in response to a trigger event. For example, as shown by reference number 210, the code repository may transmit, and the pipeline system may receive, an indication of the change using the webhook. Therefore, the pipeline system may trigger a script in response to the indication from the webhook. The script may include a set of BASH instructions, a set of Python instructions, and/or another set of sequential instructions for execution. The pipeline system may select the script (e.g., from a plurality of possible scripts) based on the cloud infrastructure. For example, the pipeline system may select the script as described above in connection with FIG. 1A.

The pipeline system may forward transmit a command to execute the script (e.g., configured to check the cloud infrastructure for compliance) to the compliance system. For example, as shown by reference number 215, the pipeline system may transmit, and the compliance system may receive, the command.

Additionally, or alternatively, the pipeline system may transmit the indication of the change directly (e.g., by forwarding, to the compliance system and from the code repository, packets that include the indication, or by decoding packets from the code repository and re-encoding the indication into packets that are transmitted to the compliance system). Accordingly, the compliance system may select the script rather than the pipeline system.

Although the example 200 is described with the compliance system as separate (e.g., physically, logically, and/or virtually) from the code repository and the pipeline system, other examples may include the compliance system as at least partially integrated (e.g., physically, logically, and/or virtually) with the code repository and/or the pipeline system. For example, the compliance system may include software that executes over (and/or is supported by) hardware of the code repository and/or the pipeline system. In another example, two or more of the compliance system, the code repository, or the pipeline system may execute over (and/or be supported by) a same cloud computing system (e.g., as described in connection with FIG. 3).

As shown by reference number 220, the compliance system may execute the script to determine compliance of the cloud infrastructure (e.g., with a set of requirements). Although the example 200 is described in connection with the user device transmitting the indication of the change to the code repository, other examples may include the user device transmitting the indication of the change to the pipeline system (e.g., similarly as described in connection with FIG. 1A). Additionally, or alternatively, the user device may transmit the indication of the change directly to the compliance system. Accordingly, the compliance system may transmit, and the code repository may receive, a request for the script, and the code repository may transmit, and the compliance system may receive, the script in response to the request.

Figure 2B:
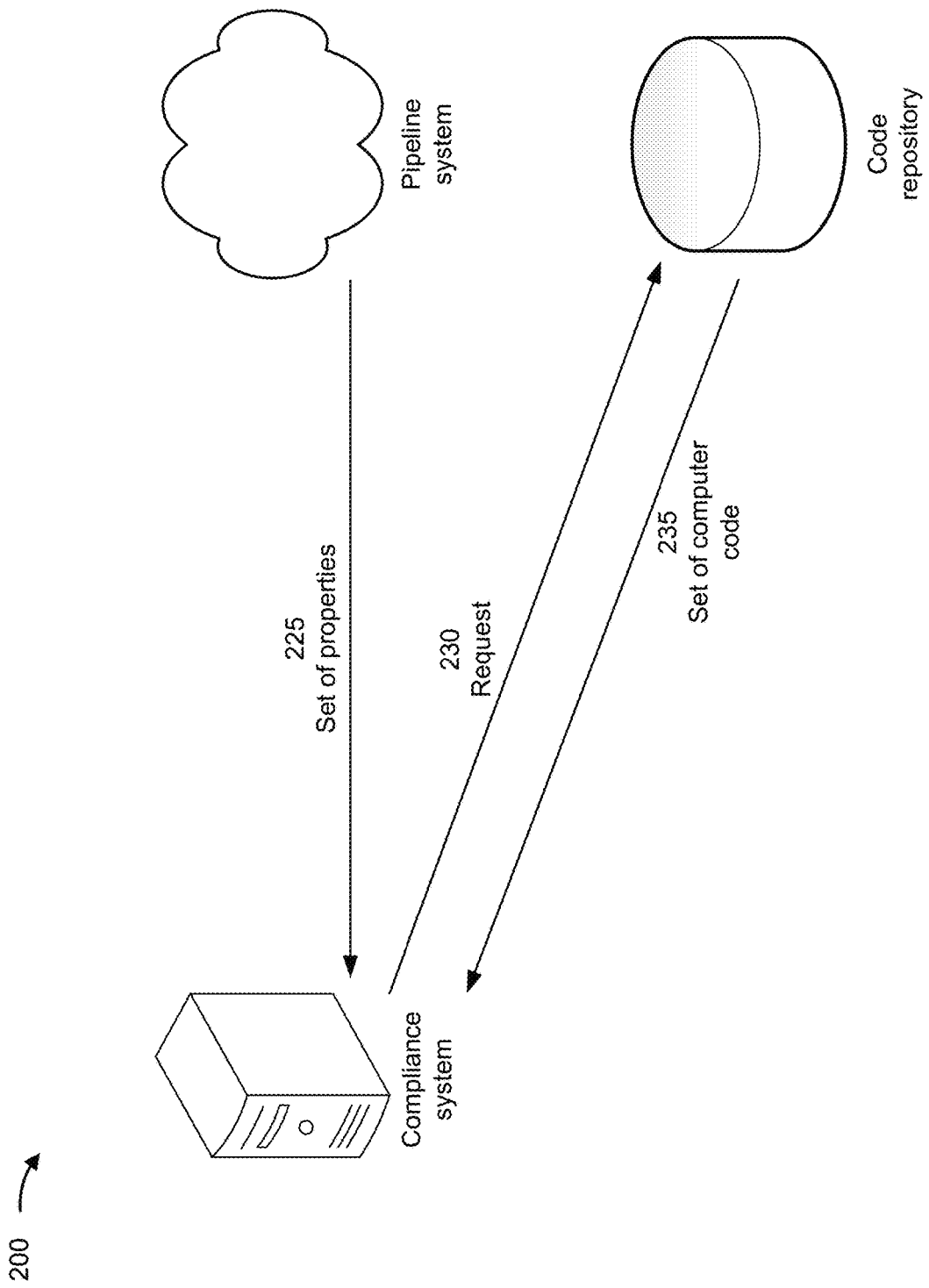

As shown in FIG. 2B and by reference number 225, the pipeline system may transmit, and the compliance system may receive, a set of properties associated with configuration of the cloud infrastructure. The set of properties may be encoded in a table (or another type of relational data structure) or a graph (or another type of NoSQL data structure), among other examples. In some implementations, the pipeline system may automatically transmit the set of properties in response to the command and/or the indication from the pipeline system.

Although the example 200 is described in connection with the pipeline system automatically transmitting the set of properties, other examples may include the compliance system requesting the set of properties. For example, similarly as described in connection with FIG. 1B, the compliance system may transmit, and the pipeline system may receive, a request for the set of properties, and the pipeline system may transmit, and the compliance system may receive, the set of properties in response to the request.

As shown by reference number 230, the compliance system may transmit, and the code repository may receive, a request for a set of computer code associated with the cloud infrastructure. The request may include an HTTP request, an FTP request, and/or an API call, among other examples. The request may indicate (e.g., in a header and/or as an argument) the cloud infrastructure. In some implementations, the compliance system may transmit the request in response to the command and/or the indication from the pipeline system, as described above in connection with reference number 215. Additionally, or alternatively, the compliance system may transmit the request based on executing the script (e.g., because transmitting the request is included in an instruction in the script).

As shown by reference number 235, the code repository may transmit, and the compliance system may receive, the set of computer code. The set of computer code may comprise files (e.g., one or more files). In other words, the set of computer code may be included in (e.g., encoded in) the files. For example, the files may include library files (e.g., from the C++ Standard Library, the Python Standard Library, or the Java Class Library, among other examples) in addition to source code files. The pipeline system may transmit the set of computer code in an HTTP response, in an FTP response, and/or as a return from an API function.

Although the example 200 is described in connection with the compliance system requesting the set of computer code, other examples may include the code repository automatically transmitting the set of computer code to the compliance system. For example, similarly as described in connection with FIG. 1B, the code repository may automatically transmit the set of computer code in response to the change from the user device.

Figure 2C:
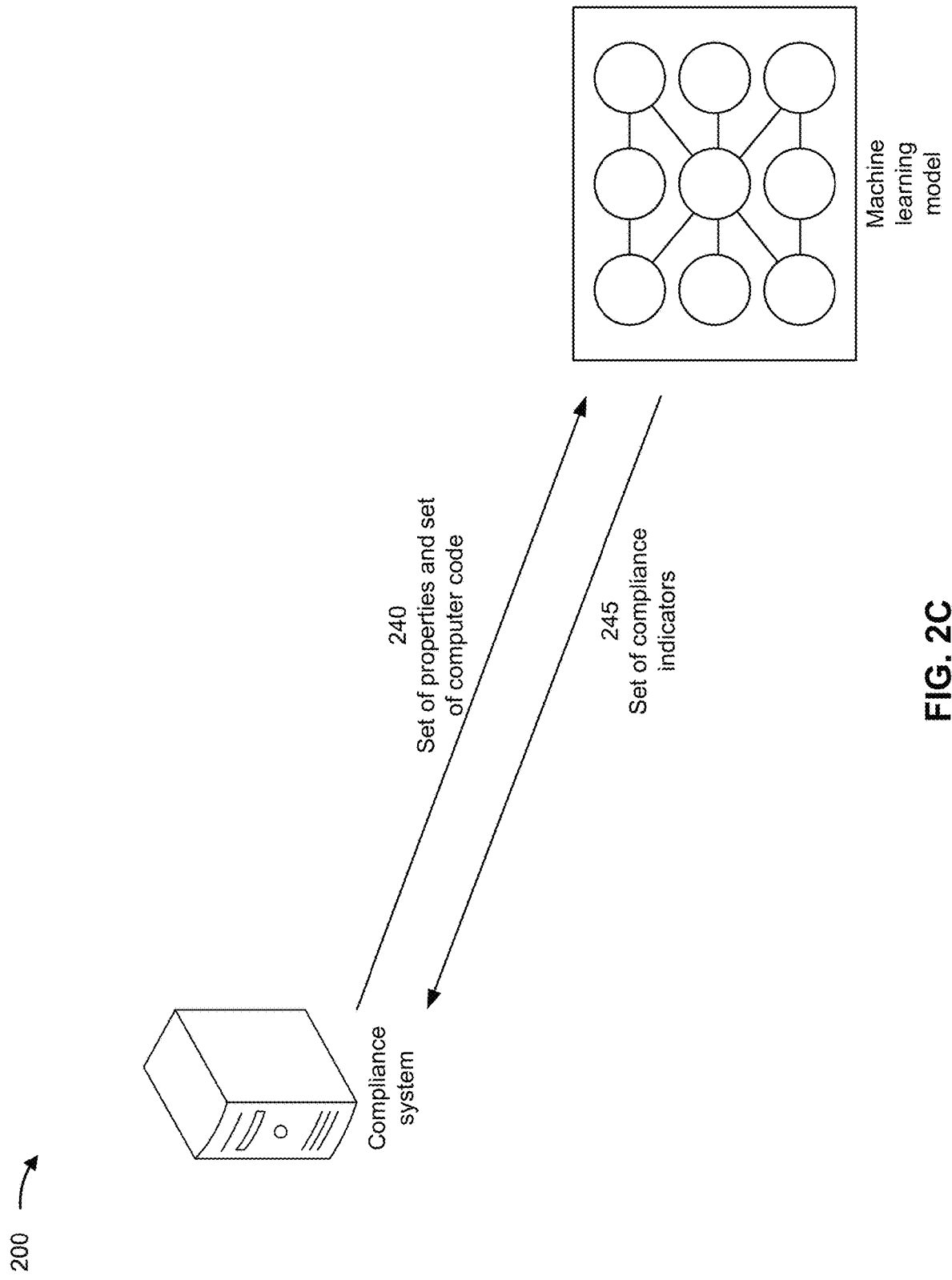

As shown in FIG. 2C and by reference number 240, the compliance system may provide the set of properties and/or the set of computer code to the ML model. For example, the compliance system may transmit, and the ML host may receive, a request including the set of properties and/or the set of computer code. As shown by reference number 245, the compliance system may receive the set of compliance indicators from the ML model (e.g., from the ML host). The set of compliance indicators may be associated with a corresponding set of severity levels. The ML model may operate as described above in connection with FIG. 1C.

As described in connection with FIG. 1C, the compliance system may therefore selectively deploy the change to the cloud infrastructure using the corresponding set of severity levels. Selectively deploying changes to the cloud infrastructure ensures that the cloud infrastructure is more secure. A more secure cloud infrastructure suffers less downtime, which reduces latency for any users that depend on the cloud infrastructure.

Figure 2D:
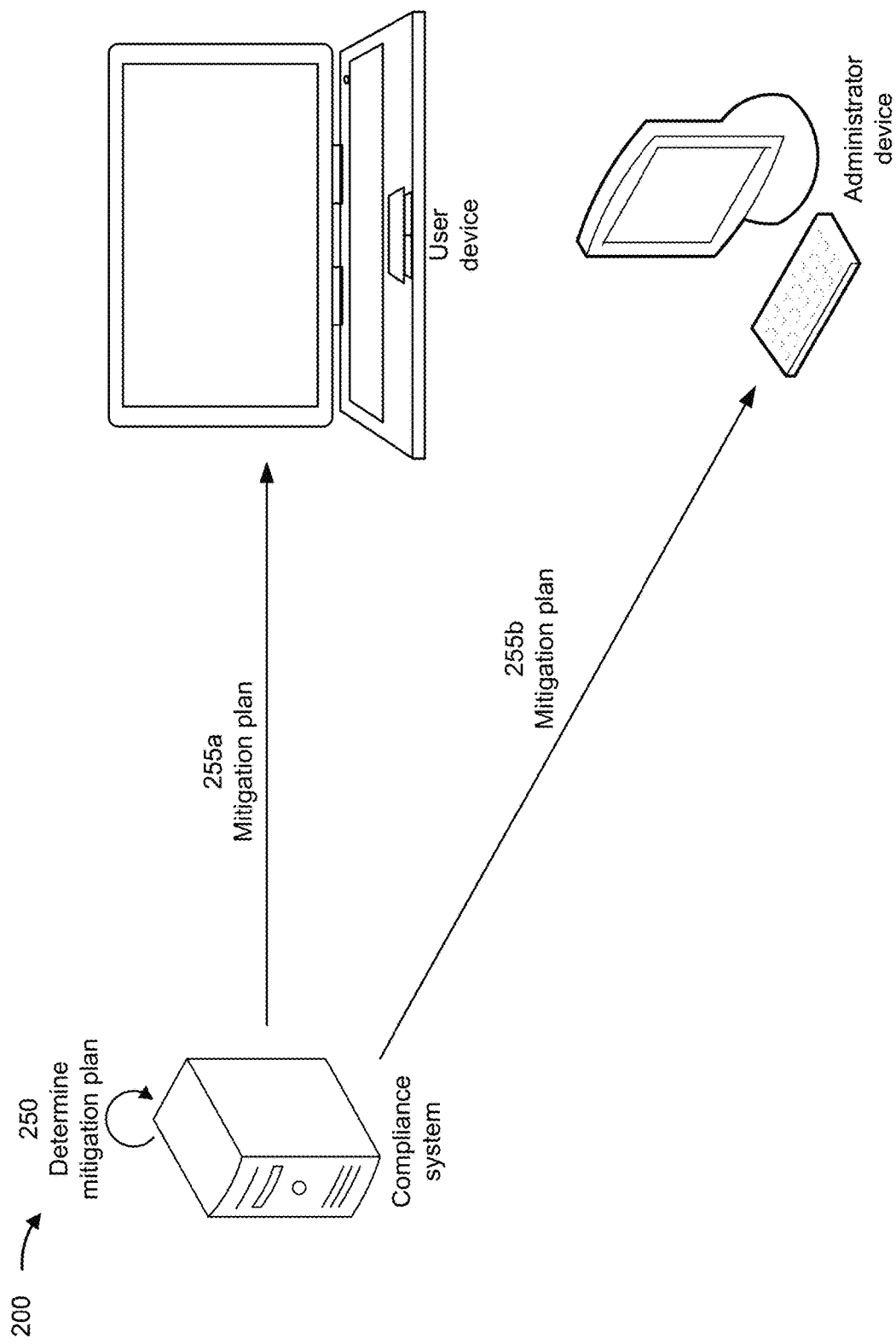

In some implementations, selective deployment may be based on a mitigation plan (e.g., in addition to, or in lieu of, the corresponding set of severity levels lacking a high severity level). Therefore, as shown in FIG. 2D and by reference number 250, the compliance system may determine a mitigation plan for a compliance indicator (e.g., one or more compliance indicators), in the set of compliance indicators, associated with a low severity level (e.g., at least one low severity low) and/or a medium severity level (e.g., at least one medium severity level) in the set of the corresponding set of severity levels. In some implementations, the compliance system may receive an indication of the mitigation plan from the ML model. Additionally, or alternatively, the compliance system may map the set of compliance indicators to a corresponding mitigation plan (e.g., using a table or another type of data structure that maps compliance indicators to identifiers of mitigation plans).

As shown by reference number 255a, the compliance system may transmit, and the user device may receive, the mitigation plan. The compliance system may transmit a message, with the mitigation plan, in response to the change from the user device, as described in connection with reference number 205. Additionally, or alternatively, as shown by reference number 255b, the compliance system may transmit, and the administrator device may receive, the mitigation plan. The compliance system may transmit a message, with the mitigation plan, to the administrator device.

Although the example 200 is shown with the compliance system determining the mitigation plan, other examples may include the user device transmitting, and the compliance system receiving, the mitigation plan. For example, the user device may transmit the mitigation plan in response to a representation of the set of compliance indicators, as described above in connection with FIG. 1D.

Figure 2E:
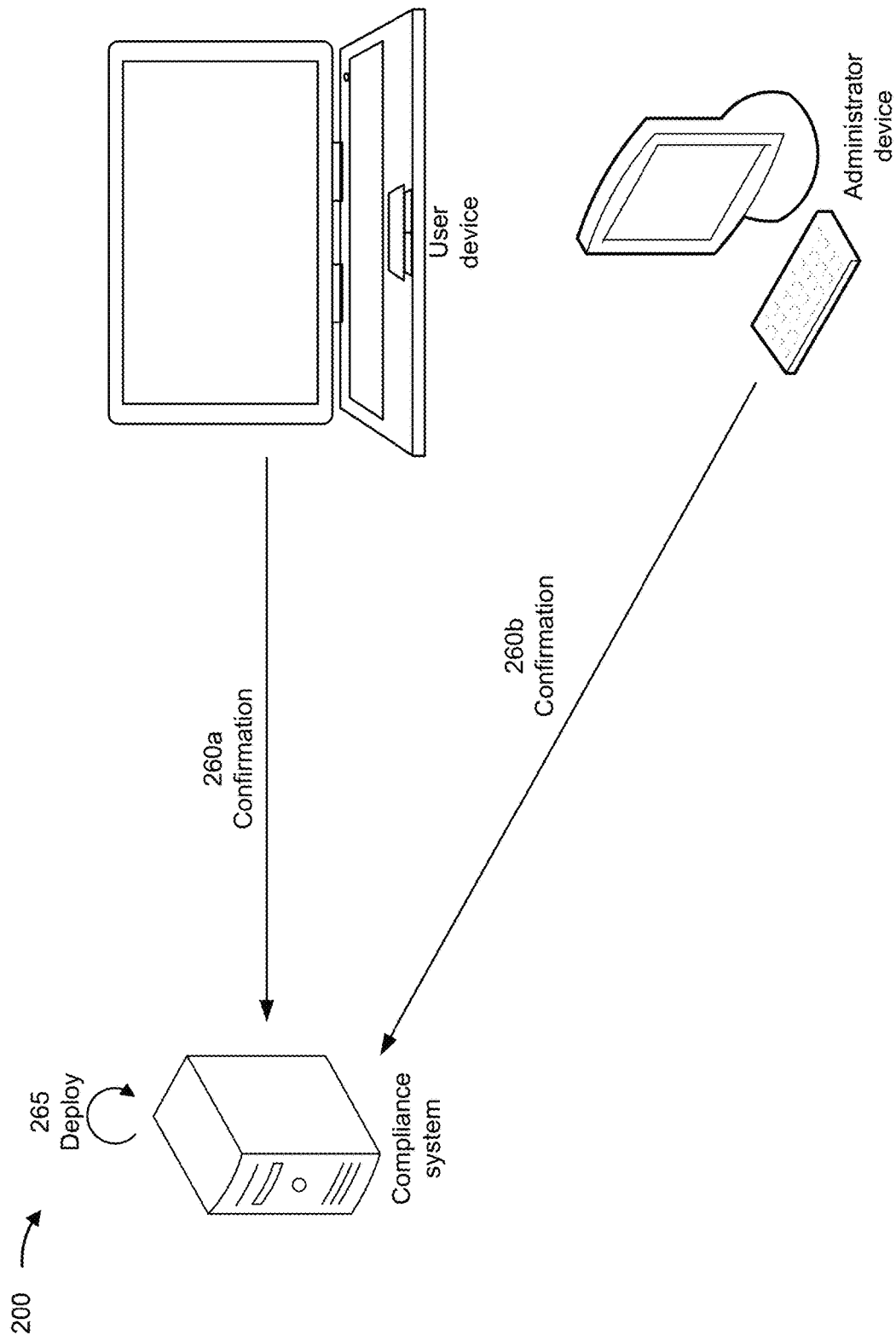

As shown in FIG. 2E and by reference number 260a, the user device may transmit, and the compliance system may receive, a confirmation to proceed. In some implementations, the user of the user device may provide input (e.g., using an input component of the user device) that triggers the user device to transmit the confirmation. For example, the mitigation plan may be output to the user (e.g., using an output component of the user device) using a UI, and the user may interact with the UI to provide the input that triggers the user device to transmit the confirmation. In another example, the user may provide the input using a command line, a bash shell, or another type of text interface.

Additionally, or alternatively, as shown by reference number 260b, the administrator device may transmit, and the compliance system may receive, a confirmation to proceed. In some implementations, an administrator associated with the administrator device may provide input (e.g., using an input component of the administrator device) that triggers the administrator device to transmit the confirmation. For example, the mitigation plan may be output to the administrator (e.g., using an output component of the administrator device) using a UI, and the administrator may interact with the UI to provide the input that triggers the administrator device to transmit the confirmation. In another example, the administrator may provide the input using a command line, a bash shell, or another type of text interface.

As shown by reference number 265, the compliance system may deploy the change to the cloud infrastructure in response to the confirmation from the administrator device and/or the confirmation from the user device. As a result, latency is reduced because the cloud infrastructure is not blocked from modification, and security is still improved because the user and/or the administrator are committed to using the mitigation plan to improve security of the cloud infrastructure.

As indicated above, FIGS. 2A-2E are provided as an example. Other examples may differ from what is described with regard to FIGS. 2A-2E.

Figure 3:
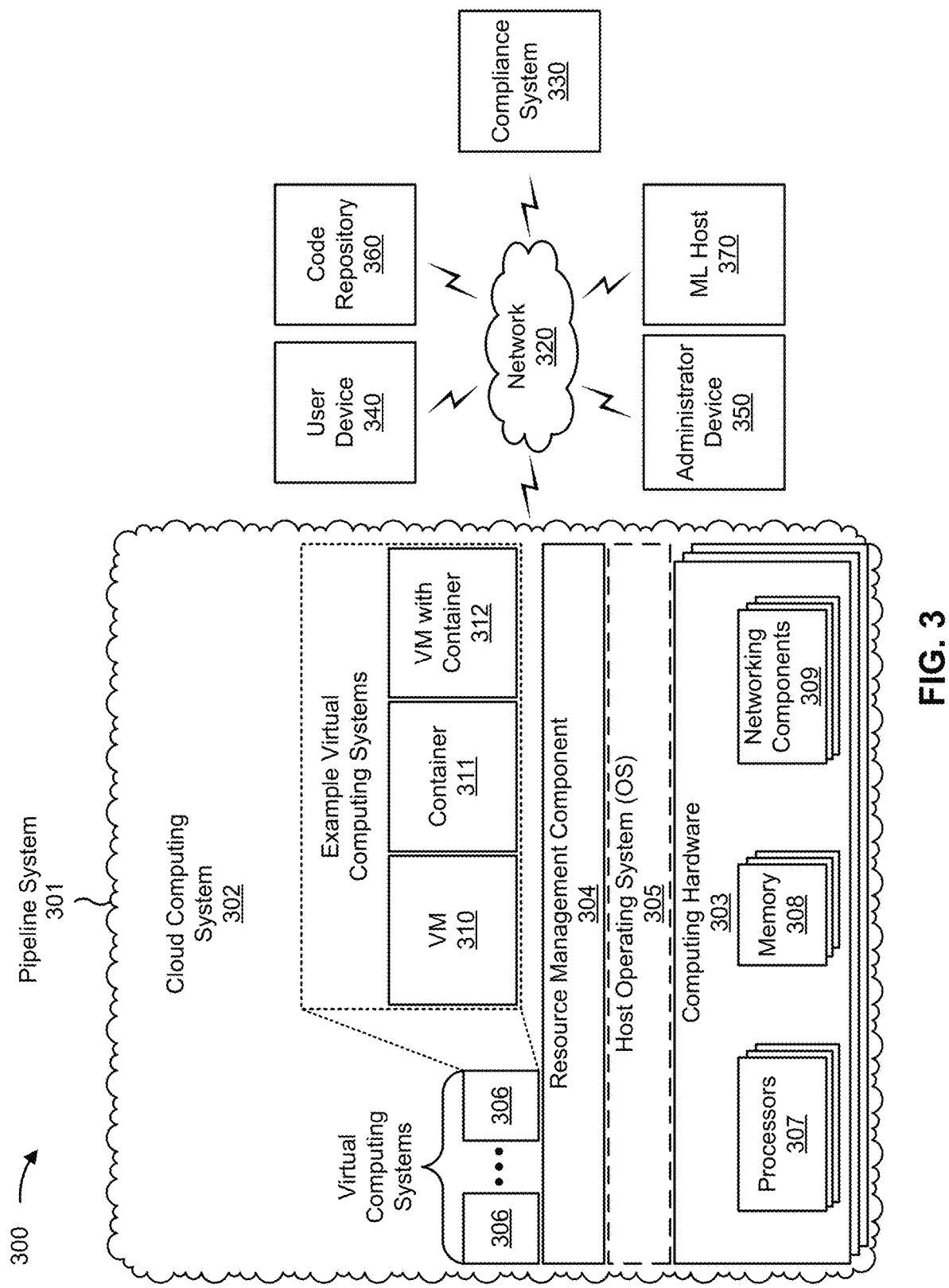
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a pipeline system 301, which may include one or more elements of and/or may execute within a cloud computing system 302. The cloud computing system 302 may include one or more elements 303-312, as described in more detail below. As further shown in FIG. 3, environment 300 may include a network 320, a compliance system 330, a user device 340, an administrator device 350, a code repository 360, and/or an ML host 370. Devices and/or elements of environment 300 may interconnect via wired connections and/or wireless connections.

The cloud computing system 302 may include computing hardware 303, a resource management component 304, a host OS 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the pipeline system 301 may include one or more elements 303-312 of the cloud computing system 302, may execute within the cloud computing system 302, and/or may be hosted within the cloud computing system 302, in some implementations, the pipeline system 301 may not be cloud-based (e.g., may be implemented outside of a cloud computing system) or may be partially cloud-based. For example, the pipeline system 301 may include one or more devices that are not part of the cloud computing system 302, such as device 400 of FIG. 4, which may include a stand-alone server or another type of computing device. The pipeline system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The compliance system 330 may include one or more devices capable of receiving, generating, storing, processing, providing, and/or routing information associated with compliance indicators, as described elsewhere herein. The compliance system 330 may include a communication device and/or a computing device. For example, the compliance system 330 may include a server, such as an application server, a client server, a web server, a database server, a host server, a proxy server, a virtual server (e.g., executing on computing hardware), or a server in a cloud computing system. In some implementations, the compliance system 330 may include computing hardware used in a cloud computing environment. The compliance system 330 may communicate with one or more other devices of environment 300, as described elsewhere herein.

The user device 340 may include one or more devices capable of receiving, generating, storing, processing, and/or providing information associated with deploy commands and code changes, as described elsewhere herein. The user device 340 may include a communication device and/or a computing device. For example, the user device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 340 may communicate with one or more other devices of environment 300, as described elsewhere herein.

The administrator device 350 may include one or more devices capable of receiving, generating, storing, processing, and/or providing information associated with escalation messages, as described elsewhere herein. The administrator device 350 may include a communication device and/or a computing device. For example, the administrator device 350 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device 350 may communicate with one or more other devices of environment 300, as described elsewhere herein.

The code repository 360 may include one or more devices capable of receiving, generating, storing, processing, and/or providing information associated with computer code, as described elsewhere herein. For example, the code repository 360 may include Github® or SourceForge®, among other examples. The code repository 360 may include a communication device and/or a computing device. For example, the code repository 360 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The code repository 360 may communicate with one or more other devices of environment 300, as described elsewhere herein.

The ML host 370 may include one or more devices capable of receiving, generating, storing, processing, and/or providing information associated with machine learning models, as described elsewhere herein. The ML host 370 may include a communication device and/or a computing device. For example, the ML host 370 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ML host 370 may communicate with one or more other devices of environment 200, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
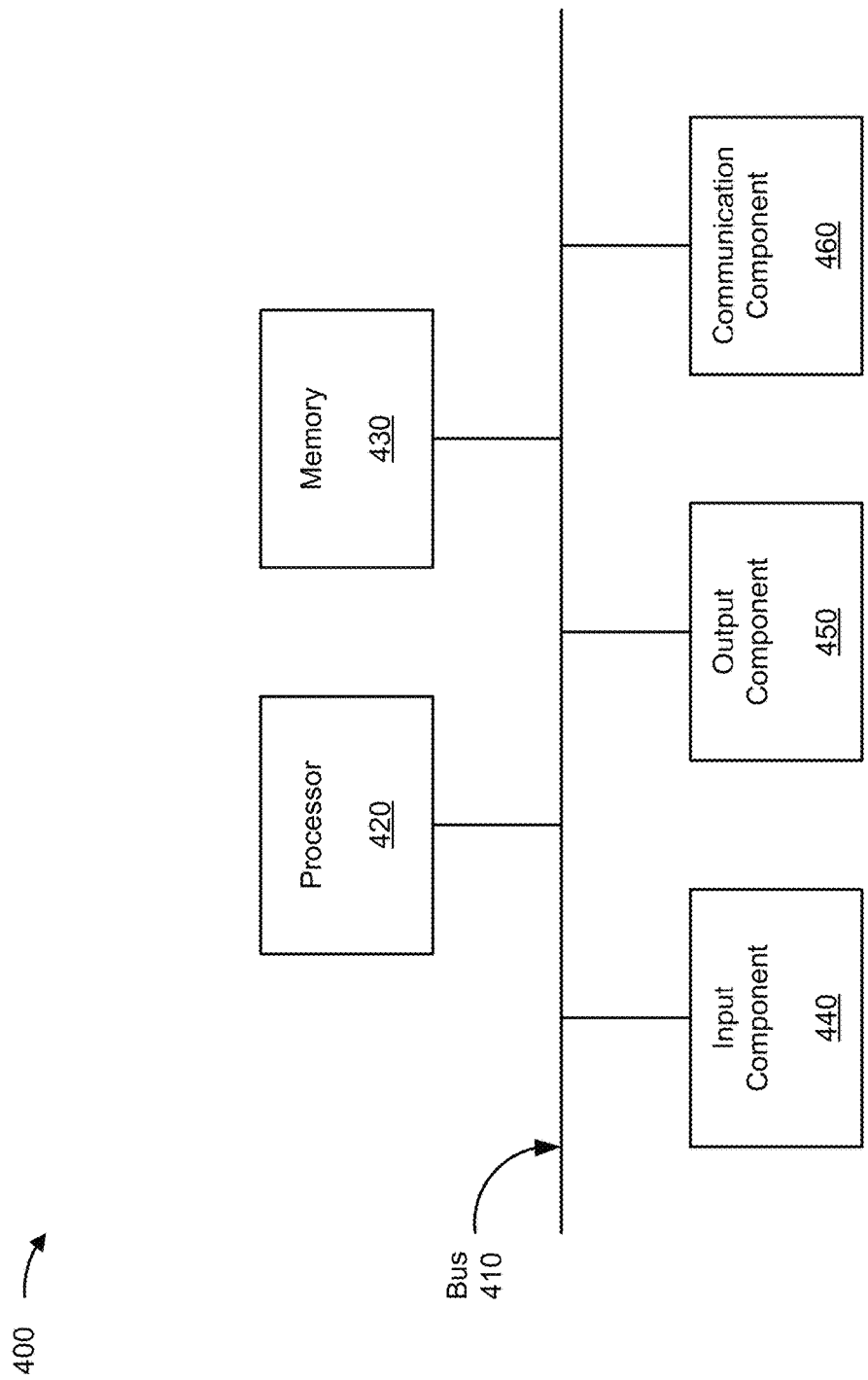
FIG. 4 is a diagram of example components of one or more devices of FIG. 3, in accordance with some embodiments of the present disclosure.

FIG. 4 is a diagram of example components of a device 400 associated with automatic compliance assessment of cloud infrastructure code. The device 400 may correspond to a compliance system 330, a user device 340, an administrator device 350, a code repository 360, and/or an ML host 370. In some implementations, a compliance system 330, a user device 340, an administrator device 350, a code repository 360, and/or an ML host 370 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
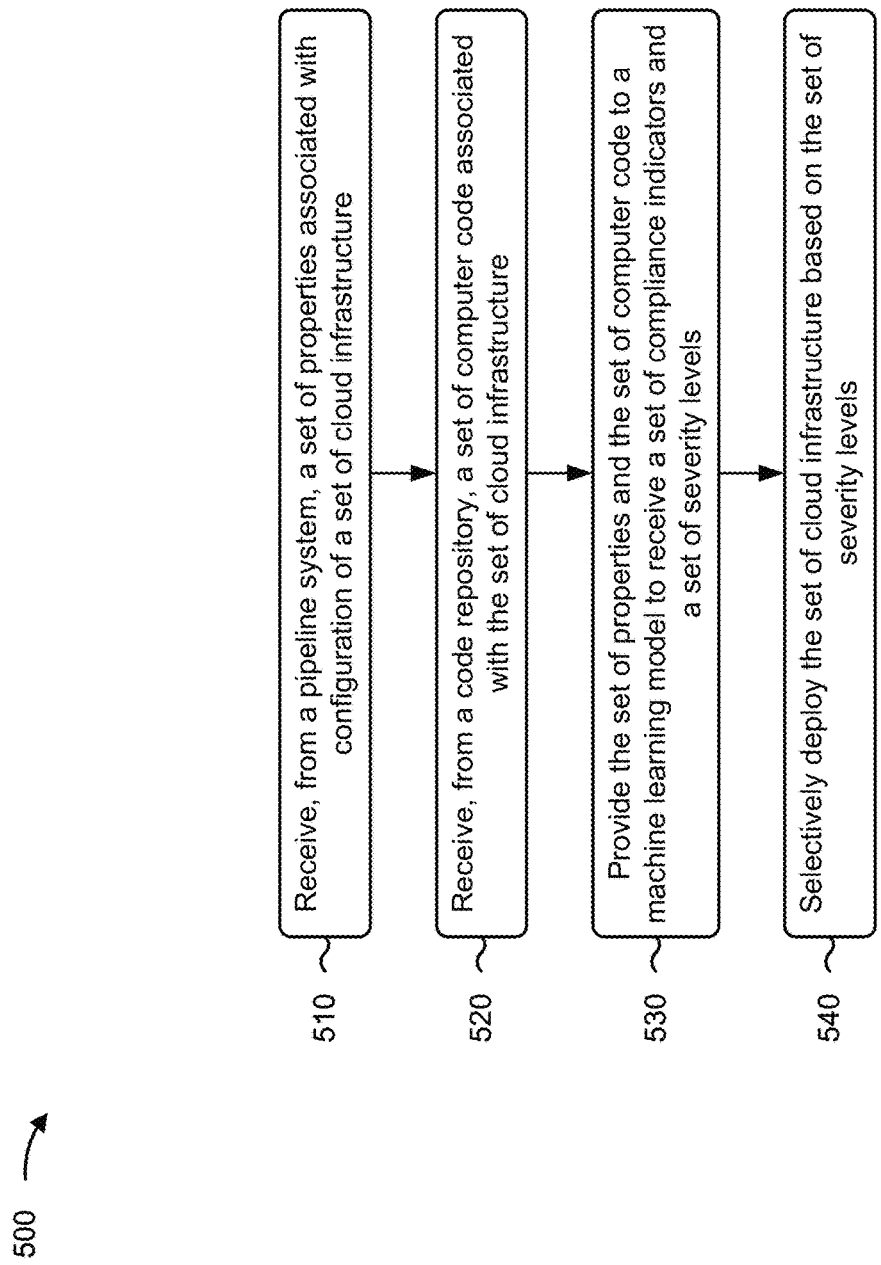
FIG. 5 is a flowchart of an example process relating to automatic compliance assessment of cloud infrastructure code, in accordance with some embodiments of the present disclosure.

FIG. 5 is a flowchart of an example process 500 associated with automatic compliance assessment of cloud infrastructure code. In some implementations, one or more process blocks of FIG. 5 may be performed by a compliance system 330. In some implementations, one or more process blocks of FIG. 5 may be performed by another device or a group of devices separate from or including the compliance system 330, such as a pipeline system 301, a user device 340, an administrator device 350, a code repository 360, and/or an ML host 370. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving, from a pipeline system, a set of properties associated with configuration of a cloud infrastructure (block 510). For example, the compliance system 330 (e.g., using processor 420, memory 430, input component 440, and/or communication component 460) may receive, from a pipeline system, a set of properties associated with configuration of a cloud infrastructure, as described above in connection with reference number 130 of FIG. 1B and/or reference number 225 of FIG. 2B. As an example, the compliance system 330 may transmit, and the pipeline system may receive, a request for the set of properties. Therefore, the pipeline system may transmit, and the compliance system 330 may receive, the set of properties in response to the request. Alternatively, the pipeline system may transmit the set of properties automatically. The set of properties may be encoded in a table (or another type of relational data structure) or a graph (or another type of NoSQL data structure), among other examples.

As further shown in FIG. 5, process 500 may include receiving, from a code repository, a set of computer code associated with the cloud infrastructure (block 520). For example, the compliance system 330 (e.g., using processor 420, memory 430, input component 440, and/or communication component 460) may receive, from a code repository, a set of computer code associated with the cloud infrastructure, as described above in connection with reference number 135 of FIG. 1B and/or reference number 235 of FIG. 2B. As an example, the compliance system 330 may transmit, and the code repository may receive, a request for the set of computer code. Therefore, the code repository may transmit, and the compliance system 330 may receive, the set of computer code in response to the request. Alternatively, the code repository may transmit the set of computer code automatically. The set of computer code may be included in (e.g., encoded in) one or more files. For example, the one or more files may include at least one library file (e.g., from the C++ Standard Library, the Python® Standard Library, or the Java® Class Library, among other examples) in addition to one or more source code files.

As further shown in FIG. 5, process 500 may include providing the set of properties and the set of computer code to a machine learning model to receive a set of compliance indicators and a set of severity levels (block 530). For example, the compliance system 330 (e.g., using processor 420, memory 430, and/or communication component 460) may provide the set of properties and the set of computer code to a machine learning model to receive a set of compliance indicators and a set of severity levels, as described above in connection with reference numbers 140 and 145 of FIG. 1C and/or reference numbers 240 and 245 of FIG. 2C. As an example, the compliance system 330 may transmit, and an ML host may receive, a request including the set of properties and/or the set of computer code. Therefore, the compliance system 330 may receive the set of compliance indicators from the ML host. As described herein, each compliance indicator in the set of compliance indicators being associated with a corresponding severity level in the set of severity levels.

As further shown in FIG. 5, process 500 may include selectively deploying the cloud infrastructure based on the set of severity levels (block 540). For example, the compliance system 330 (e.g., using processor 420 and/or memory 430) may selectively deploy the cloud infrastructure based on the set of severity levels, as described above in connection with FIG. 1D and/or FIG. 2D. As an example, selective deployment may be based on the set of severity levels satisfying one or more conditions. For example, the compliance system 330 may automatically deploy the cloud infrastructure (e.g., by transmitting a command to the code repository and/or to the pipeline system, such as a compilation command) based on the set of severity levels lacking a high severity level. In another example, the compliance system may refrain from deploying the cloud infrastructure (e.g., may block deployment by refraining from transmitting the command to the code repository and/or to the pipeline system) based on the set of severity levels including at least one high severity level.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E and/or FIGS. 2A-2E. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automatic compliance assessment of cloud infrastructure code, the system comprising:
   one or more memories; and
   one or more processors, communicatively coupled to the one or more memories, configured to:
      receive, from a pipeline system, a set of properties associated with configuration of a cloud infrastructure;
      receive, from a code repository, a set of computer code associated with the cloud infrastructure;
      provide the set of properties and the set of computer code to a machine learning model to receive a set of compliance indicators and a set of severity levels, each compliance indicator in the set of compliance indicators being associated with a corresponding severity level in the set of severity levels; and
      selectively deploy the cloud infrastructure based on the set of severity levels.

2. The system of claim 1, wherein the one or more processors are configured to:
   receive a command to deploy the cloud infrastructure; and
   transmit a request, for the set of computer code, in response to the command,
      wherein the set of computer code is received in response to the request.

3. The system of claim 1, wherein the one or more processors are configured to:
   receive, from the code repository and using a webhook, an indication of a change to the cloud infrastructure; and
   transmit a request, for the set of computer code, in response to the indication of the change,
      wherein the set of computer code is received in response to the request.

4. The system of claim 1, wherein the one or more processors are configured to:
   receive a request to escalate the set of compliance indicators; and
   transmit a message to at least one administrator device in response to the request.

5. The system of claim 4, wherein the one or more processors are configured to:
   receive an indication of a mitigation plan,
      wherein the message to the at least one administrator device indicates the mitigation plan.

6. The system of claim 1, wherein the one or more processors are configured to:
   transmit, to a ticket system, a command to open at least one ticket for at least one compliance indicator, in the set of compliance indicators, associated with a medium severity level in the set of severity levels.

7. The system of claim 1, wherein the one or more processors, to selectively deploy the cloud infrastructure based on the set of severity levels, are configured to:
   refrain from deploying the cloud infrastructure based on the set of severity levels including at least one high severity level.

8. The system of claim 1, wherein the one or more processors, to selectively deploy the cloud infrastructure based on the set of severity levels, are configured to:
   deploy the cloud infrastructure based on the set of severity levels lacking a high severity level.

9. A method of automatic compliance assessment of cloud infrastructure code, comprising:
   receiving, from a pipeline system and at a compliance system, a set of properties associated with configuration of a cloud infrastructure;

providing, by the compliance system, the set of properties to a machine learning model to receive a set of compliance indicators and a set of severity levels, each compliance indicator in the set of compliance indicators being associated with a corresponding severity level in the set of severity levels; and selectively deploying, by the compliance system, the cloud infrastructure in response to receiving the set of severity levels.

10. The method of claim 9, further comprising: transmitting, to a user device and from the compliance system, a representation of the set of compliance indicators.

11. The method of claim 10, further comprising:
receiving, from the user device and at the compliance system, a request to proceed; and
transmitting, to at least one administrator device and from the compliance system, a message in response to the request.

12. The method of claim 11, further comprising:
receiving, from the at least one administrator device and at the compliance system, a confirmation to proceed, wherein selectively deploying the cloud infrastructure comprises deploying the cloud infrastructure in response to the confirmation.

13. The method of claim 9, further comprising: determining, by the compliance system, a mitigation plan for one or more compliance indicators, in the set of compliance indicators, associated with a low severity level in the set of the set of severity levels; and transmitting, to a user device and from the compliance system, a message with the mitigation plan.

14. The method of claim 9, wherein the set of compliance indicators comprises at least one of: a stack indicator; a monitoring setup indicator; a security indicator; or a library indicator.

15. A non-transitory computer-readable medium storing a set of instructions for automatic compliance assessment of cloud infrastructure code, the set of instructions comprising:
one or more instructions that, when executed by one or more processors of a device, cause the device to:
receive, from a code repository, a set of computer code associated with a cloud infrastructure;
provide the set of computer code to a machine learning model to receive a set of compliance indicators and a set of severity levels, each compliance indicator in the set of compliance indicators being associated with a corresponding severity level in the set of severity levels; and
selectively deploy the cloud infrastructure in response to receiving the set of severity levels.

16. The non-transitory computer-readable medium of claim 15, wherein the one or more instructions, when executed by the one or more processors, cause the device to: train the machine learning model based on a set of compliance rules.

17. The non-transitory computer-readable medium of claim 15, wherein the one or more instructions, when executed by the one or more processors, cause the device to: train the machine learning model based on deployed cloud infrastructures.

18. The non-transitory computer-readable medium of claim 15, wherein the one or more instructions, when executed by the one or more processors, further cause the device to: transmit a report, to a user device, encoding the set of compliance indicators.

19. The non-transitory computer-readable medium of claim 15, wherein the one or more instructions, that cause the device to provide the set of computer code to the machine learning model, cause the device to: transmit, to a machine learning host associated with the machine learning model, the set of computer code; and receive, from the machine learning host, the set of compliance indicators.

20. The non-transitory computer-readable medium of claim 15, wherein the set of compliance indicators comprises at least one of: a stack indicator; a monitoring setup indicator; a security indicator; or a library indicator.

\* \* \* \* \*